United States Patent [19]

Scheel

[11] Patent Number: 5,592,079
[45] Date of Patent: Jan. 7, 1997

[54] MICROELECTRONIC POSITION SENSOR FOR VOLUME CONTROL

[75] Inventor: Peter U. Scheel, Byleddet, Denmark

[73] Assignee: Microtonic A/S, Roskilde, Denmark

[21] Appl. No.: 392,804

[22] PCT Filed: Sep. 3, 1992

[86] PCT No.: PCT/DK92/00264

§ 371 Date: Mar. 21, 1995

§ 102(e) Date: Mar. 21, 1995

[87] PCT Pub. No.: WO94/05965

PCT Pub. Date: Mar. 17, 1994

[51] Int. Cl.⁶ .................... G01B 7/30; H01H 19/00; H04R 25/00; H01L 43/00
[52] U.S. Cl. .................. 324/207.25; 324/207.13; 335/205; 381/68.4
[58] Field of Search .................... 324/173, 174, 324/207.13, 207.2, 207.21, 207.25, 251, 252; 323/265, 292, 294, 368; 338/32 R, 32 H; 200/564, 565; 335/205–207; 381/68, 68.2, 68.4

[56] References Cited

U.S. PATENT DOCUMENTS

| | | |
|---|---|---|
| 3,139,600 | 6/1964 | Rasmanis et al. ............ 324/207.2 X |
| 4,054,860 | 10/1977 | Henderson et al. . |
| 4,054,861 | 10/1977 | Markison . |
| 4,199,741 | 4/1980 | Paulet . |
| 4,415,856 | 11/1983 | Welles . |
| 4,459,578 | 7/1984 | Sava et al. . |
| 4,789,826 | 12/1988 | Willett . |
| 4,970,463 | 11/1990 | Wolf et al. . |
| 5,115,194 | 5/1992 | Luetzow et al. . |
| 5,380,965 | 1/1995 | Moller . |

FOREIGN PATENT DOCUMENTS

| | | |
|---|---|---|
| 168258B1 | 2/1994 | Denmark . |
| 3908892A1 | 9/1990 | Germany . |

*Primary Examiner*—Gerard R. Strecker
*Attorney, Agent, or Firm*—Watson Cole Stevens Davis, PLLC.

[57] ABSTRACT

A microelectronic position sensor having a stationary base portion including magnetic field sensitive elements and an adjustment means rotatably mounted within the adjustment means and including a permanent magnet; the adjustment means being electrically coupled to the apparatus by means of a plurality of electrically conductive terminals embedded in the adjustment means; the adjustment means including an integrated circuit on which the magnetic field sensitive elements are mounted for providing an electrical signal depending on the position of the permanent magnet and the rotor; the adjustment means and the stationary base portion include housing parts having interengaging flanges and forming together a self-contained unit encompassing the electric and magnetic components of the position sensor and in which the adjustment means is rotatably mounted on the stationary base member; a soft-iron member is mounted in the stationary base member to form an iron return path in the magnetic system comprising the permanent magnet and the magnetic field sensitive elements; and the electrically conductive contact between the terminals and the integrated circuit is effected by bonding to the integrated circuit, each terminal being separately secured to the integrated circuit.

4 Claims, 3 Drawing Sheets

MICROELECTRONIC POSITION SENSOR FOR VOLUME CONTROL

BACKGROUND OF THE INVENTION

1. Field of the Invention

The invention relates to a microelectronic position sensor, e.g for use in hearing aids and the like for volume control, function shifts or changes of another adjustable parameter of the associated apparatus, said position sensor operating by means of magnetic field sensitive elements and comprising a stationary base portion or stator which contains magnetic field sensitive elements and an adjustment means or rotor which is rotatably mounted and contains a permanent magnet, and wherein the stator is electrically coupled to the associated apparatus by means of a plurality of electrically conductive terminals which are embedded in the stator, said stator comprising an integrated circuit on which the magnetic field sensitive means are arranged for providing an electrical signal depending on the position of the permanent magnet and hence of the rotor.

2. Related Art

A position sensor of the above mentioned type is disclosed in U.S. Pat. No. 4,415,856. This prior art sensor has its rotor mounted through an aperture in a panel of a housing. The stator integrated circuit placed in a dual-in-line package (DIP) is mounted on a printed circuit board in the housing below the rotor. Such DIP member is a standard component having a size of approx. 10×6 mm with a distance between its four terminals on each side of approx. 2.5 mm. The mutually independent mounting of the stator and rotor implies a considerable distance between the magnet of the rotor- and the magnetic field sensitive elements in the stator which is detrimental to a reliable and precise operation. This again, however, has the adverse effect of increasing the required size of the permanent magnet for obtaining a sufficient magnetic response of the sensitive elements. The total height of a sensor of this kind is large due to the above indicated structural features and the termination method to be used on the DIP member.

A position sensor of the above mentioned type is, through its integral circuits, particularly suitable for providing digital output signals, which is important when the remaining circuits of an equipment are entirely or partially based on such signals. However, this known Hall effect position sensor is not suitable—nor—meant—for microelectronic use where the outer dimensions of a e.g. for use in hearing aids, should not exceed a magnitude of 3.4 mm, neither in diameter nor in height, and therefore it does not offer a solution of position sensors of such size and having sufficiently accurate operation positions. The same applies to other known embodiments of Hall effect position sensors or rotary switches, cf. e.g. U.S. Pat. Nos. 4054860, 4054861, 4199741, and 4459578 and DE patent publication No. DE-A-3908892.

Electronic pulse generators for microelectronic use e.g. in hearing aids are known from the Applicant's Danish patent applications Nos. 1838/90 and 52/91. Although the inventions according to applications relate to a development of such pulse towards an increasingly simple and at the same time electronically more reliable electromechanical construction, they are, precisely from a construction point of view, comparatively complex with the ensuing risks of malfunction during use thereof in hearing aids, and correspondingly costly to produce.

SUMMARY OF THE INVENTION

It is therefore the object of the invention to provide a microelectronic position sensor, in particular for use in hearing aids and the like, which remedies the above disadvantages of the hitherto known position sensors or electromechanical pulse generators.

This object is achieved by means of a microelectronic position sensor of the type having the following features: a stationary base portion including magnetic field sensitive elements and an adjustment means rotatably mounted within the adjustment means and including a permanent magnet; the adjustment means being electrically coupled to the apparatus by means of a plurality of electrically conductive terminals embedded in the adjustment means; the adjustment means comprising an integrated circuit on which the magnetic field sensitive elements are mounted for providing an electrical signal depending on the position of the permanent magnet and the rotor; the adjustment means and the stationary base portion comprise housing parts having interengaging flanges and forming together a self-contained unit encompassing the electric and magnetic components of the position sensor and in which the adjustment means is rotatably mounted on the stationary base member; a soft-iron member is mounted in the stationary base member to form an iron return path in the magnetic system comprising the permanent magnet and the magnetic field sensitive elements; and the electrically conductive contact between the terminals and the integrated circuit is effected by bonding to the integrated circuit, each terminal being separately secured to the integrated circuit.

Further advantageous features of the microelectronic position sensor according to the invention will appear from the following description.

The microelectronic position sensor according to the invention is particularly outstanding due to its very simple construction with few mechanical parts and its surprisingly high degree of operational accuracy, all of which is obtained while retaining the very small outer dimensions, about one order of magnitude smaller than the prior art position sensor initially mentioned.

The position sensor is incorporated as a component of e.g. hearing aids and the like with full digital control, that is electronic control based on a computer circuit. It is expected that hearing aids of this type will become an important object for the future further development of hearing aids in general. One of the properties of this component with respect to this use in addition to its mode of operation will be a highly improved reliability compared to the hitherto known volume controls and switches.

Therefore, the component is constructed as a simple magnetic which contains only a magnet and an integrated circuit (IC) which is located in the magnetic field. The magnetic system may be designed in many ways. Thus, the magnet may be located parallelly with or angularly to the integrated circuit. The integrated circuit comprises a serial data line which, via a single electrical connection, transmits binary figures corresponding to 0 and 1 which, in turn, correspond to low and high voltages. The incorporation of a computer into a hearing aid permits the computer to carry out comparatively complex operations on the basis of a simple input signal via the serial data line. The position sensor provides a signal in the form of a code (a number) corresponding to the rotor position relative to the stator whereupon the computer converts the signal to the desired adjustment of the hearing aid, be it volume control, switch of program, tone control, mode shift or the like.

The rotor with the incorporated permanent rod- or disc-shaped magnet may be freely rotated manually over 360° on the stator whereby the magnet influences on the circuits of the integrated circuit in the stator so as to allow the integrated circuit to determine the instantaneous position of the rotor. If desired, the stator may be provided with a mechanical stop for the rotation of the rotor. The rotor and stator may conveniently be made of a moulded plastics material. The component appears with the built-in integrated circuit as an active component which requires an energy supply usually with a supply voltage higher than or equal to 1 V and having a tolerance of up to 5 V and a ripple of ±0.3 V with a ripple frequency of less than 2000 Hz. Therefore, the component is usually provided with three terminals for this purpose which are embedded in the stator, viz the line whereupon data from the component to the computer of the hearing aid is transmitted and the positive and negative battery voltage. The signalling could also be effected as a current or voltage modulation on the power supply line. In that case the component could be made to operate with two connections only.

It is often necessary to adjust the supply voltage in microelectronic devices. However, a control of the battery voltage may often only partially be incorporated in the integrated circuit which should therefore be supplemented with an external capacitor having its own terminal. Thus, the component has a further terminal, i.e. normally a total of four terminals which are electrically conductively connected to the integrated circuit.

Following mounting of the terminals on the integrated circuit, the latter may be embedded into the stator.

The integrated circuit also comprises a number of magnetic field sensitive elements consisting of a magnetic field effect transistor (MAGFET) having two or more drains for splitting the current in the individual MAGFET, such splitting permitting measurement of the differential current between the terminals of the elements when, by means of the permanent magnet of the rotor, a magnetic field is established perpendicular to the element. Measurement of the differential current presents an advantage as to the noise-level of the component compared to measurement of voltage in a Hall element and, likewise, the use of e.g. three drains provides an improved sensitivity.

The determination of the rotor position relative to that of the stator by means of the integrated circuit is effected either digitally or analogly.

In the digital solution, the magnetic field sensitive elements or sensors in the integrated circuit are arranged on a circle and in a number corresponding to the desired angular resolution whereupon the signals from the individual sensors are compared by means of a number of comparators so as to generate a series of digital signals from the comparisons which, by use of a digital decoding circuit, are converted to digital codes. The inconvenience associated with the digital solution is the positioning of many sensors, e.g. 64, with corresponding connections to obtain a desired angular resolution, on a circle in the integrated circuit. The advantage associated with the digital solution consists in fast and simple measurements with the exclusive use of comparators.

In the analog solution, the magnitude of the magnetic field is measured with one or more sensors which provide(s) an analog signal depending on the position of the permanent magnet and which may consequently be used for the position determination.

A sensor provides a signal which is approximately linearly depending on the relevant applied magnetic field. The magnetic field varies with the rotor position and if there is to be proportionality between the signal and the rotational angle, the magnetic field should vary linearly with the angle.

With only one sensor it is impossible to obtain an unambiguous relation between signal and position. When the rotor and thus the magnet is rotated 360°, the field will vary from a minimum value to a maximum and back again. Therefore, the same field strength will occur for two positions of the rotor. The lacking information about the position is obtained by means of an additional sensor which senses the field at a certain distance from the first one.

If the field varies sinusoidally, two sensors may advantageously be applied which are displaced 90° relative to each other and then the sensor is used which, for a given position, provides the most convenient signal. According to the circumstances, the sensor which provides the most powerful signal is used and which thus reduces the noise problems, or else the sensor which provides the smallest signal and which consequently has the highest sensitivity=largest change of the signal for a small position change (the sensor with the largest signal provides less sensitivity, the field being here on the flat top at a maximum).

The signal from the sensor is converted by an A/D converter to a digital code which may assume a possible number of values corresponding to the given number of bits in the code. This presents a problem as it is not known how large the maximum signal from the sensor will be. Variations in the magnetic circuit will occur which may give rise to variations in the maximum magnetic field strength, and differences in the parameters of the electronic circuit may occur.

This means that there is a risk that the codes corresponding to the largest signals may drop out so that maximum (or minimum) may not be set on the component.

However, there may always be used a suitably wide safety margin, so that the signal will be sufficiently large to prevent codes from dropping out. If the variations are wide, however, this margin should be sufficiently wide to form, when the signal is at its largest, a large angle range, in which the A/D converter provides a fixed maximum or minimum value.

The problem of the unknown largest and smallest values provided by the sensor may be solved by using two sensors which are displaced 90° relative to each other and by utilizing the fact that it is guaranteed that the signal can reach 0.

The sensor which provides the smallest signal is used to provide the measurement signal. The other sensor is used as a reference, and for the position determination the value is used which is obtained by division of the measurement signal with the reference signal. If the measurement signal is 0, the reference value will be the maximum. If the angle is changed slowly the measurement signal will increase and the reference value will decrease. In total an increasing value will be obtained which will be I when the measurement signal and the reference signal have reached the same level. This corresponds to an angle of 45 relative to the 0 level.

The reference signal is compared to the measurement signal by means of a comparator and when the measurement signal is the largest the two signals change roles. A rotation over an angle of 90° from the 0 level will generate a signal which varies from 0 at 0° to 1 at 45° and back to 0 at 0°. Therefore, this signal cannot be used directly. All codes will appear twice within an angle range of 90°. This ambiguity is resolved by performing a binary magnitude comparison of the numerical value of the measurement signal to the numerical value of the reference signal and using this information to discriminate code segments. This comparison adds 1 bit to the code.

This ambiguity is resolved by performing a binary magnitude comparison of the numerical value of the measurement signal to the numerical value of the reference signal and using this information to discriminate code segments. This comparison adds 1 bit to the code. In case of a desired resolution of 6 bits corresponding to 64 positions, the three most significant bits may be derived by magnitude comparison and sign monitoring as explained above. The remaining 3 bits may be derived from an A/D conversion of the ratio of measurement signal to reference signal or reference signal to measurement signal whatever has the least numerical value.

The analog solution using the A/D converter presents the advantage that it is very simple to double the number of codes. This is done by allowing the A/D conversion to be effected with one additional bit. If it is desired to have e.g. a seven-bits code for the position, the additional bit may be introduced simply by using a four-bits A/D converter. Such doubling of the number of codes presents certain problems in the digital solution, e.g. with dimension tolerances.

An increase of the number of codes may provide an increased angular resolution, but an additional advantage associated with the additional bit is that it may be used for noise suppression. For instance, the circuit may be so designed that it does not transmit a new position code until one is detected which is a certain value higher than the preceding one or which is different from the two most recently registered positions.

According to a particular embodiment, the integrated circuit contains a potentiometer or a variable resistor in addition to the magnetic field sensitive elements and the further position determining circuits, thereby making the component appear as a conventional rotary potentiometer thus allowing use of the component in conventional microelectronic devices without fully digital control.

According to another particular embodiment the integrated circuit in addition to the magnetic field sensitive elements and other position determining circuits contains an amplifier with variable amplification for amplifying electronic signals. The amplification is determined by the position of the rotor relative to the stator.

Finally, the integrated circuit may comprise a control circuit for supply voltage so that external control thereof is unnecessary.

BRIEF DESCRIPTION OF THE DRAWINGS

The invention will now be described in further detail with reference to the drawings which in a non-limiting manner exemplify an embodiment of the invention, and wherein.

Figure 1:
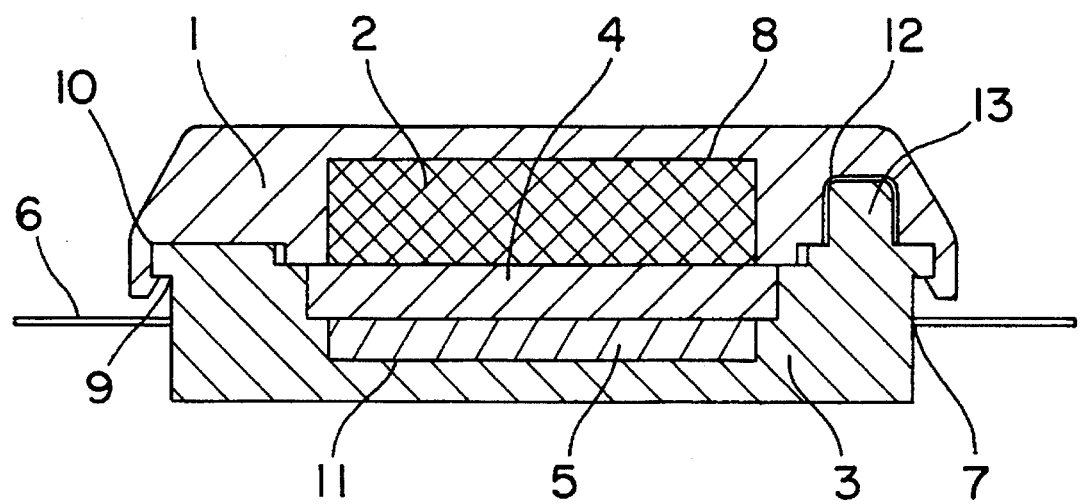
FIG. 1 is a vertical section through a position sensor and FIGS. 2 and 3 are exploded views thereof showing the magnetic sensitive circularly positioned elements.
Figure 2:
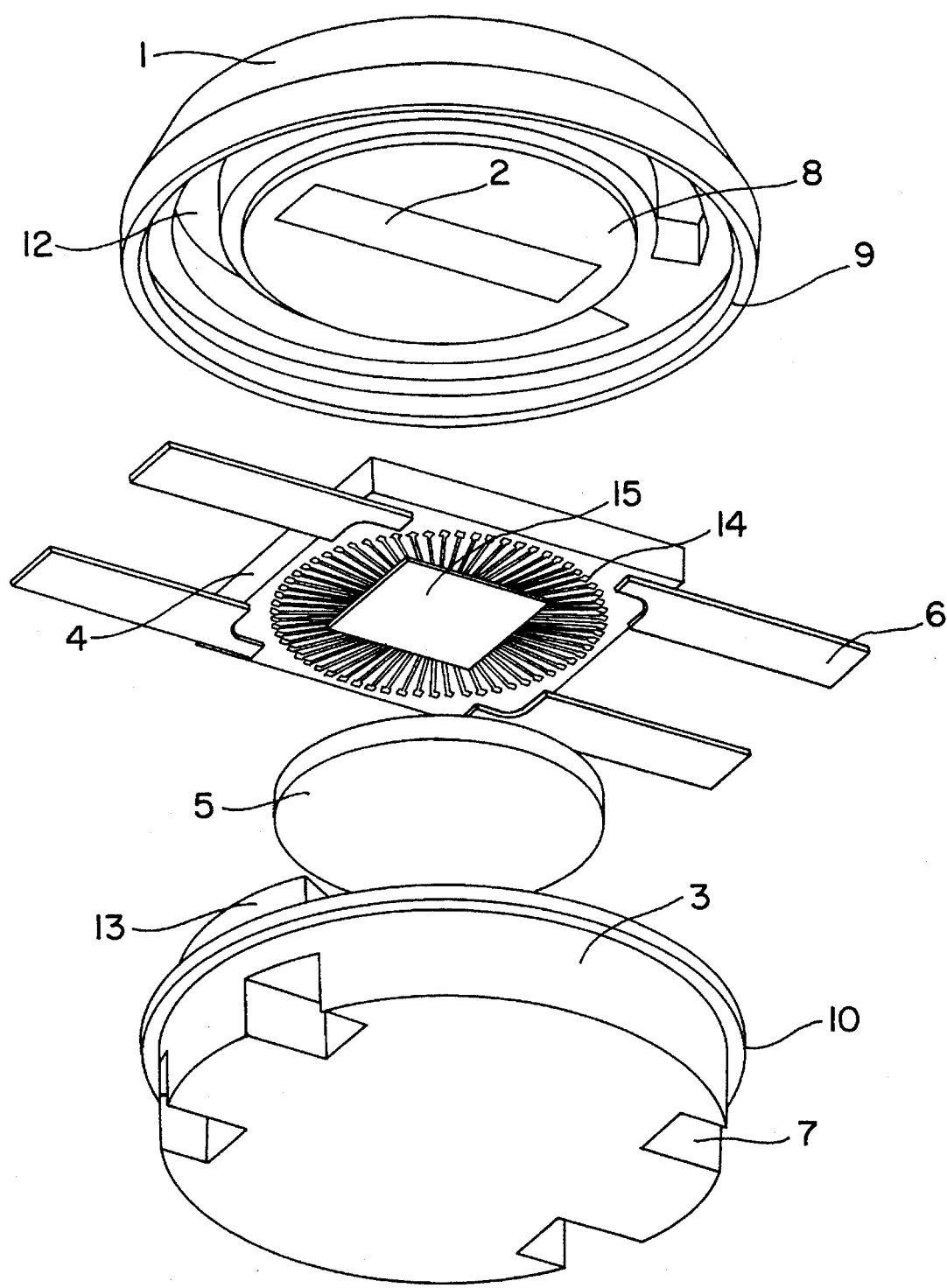
Figure 3:
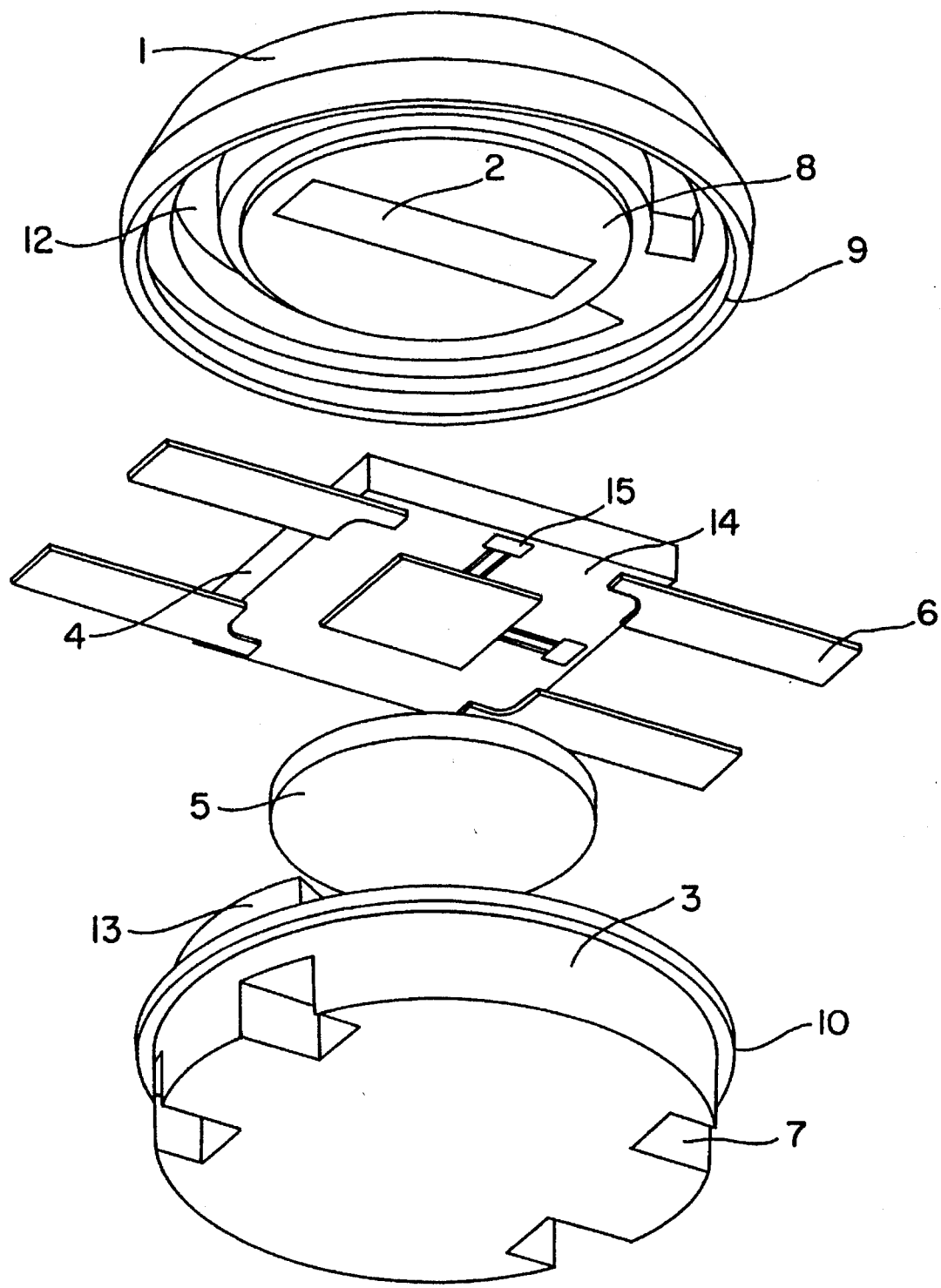

DETAILED DESCRIPTION 1 denotes a circular rotatable knob or rotor having a downwardly facing hollow space 8 wherein a permanent magnet 2—in the figure a rod magnet—is arranged. In its mounted position, the rotor 1 engages in a known manner and by means of an inwardly facing flange 9 with a corresponding outwardly Facing flange 10 on a base portion or stator 3, in the internal upwardly facing hollow space 11 of which a soft-iron disc 5 is mounted and immediately on top of the disc an integrated circuit 4 having magnetic field sensitive elements 14 and associated circuitry 15, is mounted. To peripheral areas of the circuit, a total of four terminals 6 are mounted by tape automated bonding (TAB) and thus in electrically conductive connection thereto, said terminals 6 being embedded in the hollow space 11 of the stator 3 together with the circuit 4 and the iron disc. The terminals 6 are embedded in the stator or they extend through its wall through ducts or notches 7.

When the rotor 1 with the magnet 2 is rotated relative to the stator 3 with the integrated circuit 4, which rotation may he effected freely in both directions within a rotational range determined by the mechanical stop 13 and the groove in the knob 12, the position change of the magnet effected is sensed by the magnetic field sensitive elements of the circuit and is converted as disclosed above to a digital code which is transmitted to a computer in a not shown hearing aid of which the position sensor is a part. The computer converts the code signal received to the desired function in the apparatus, e.g. to increase or reduce the volume.

I claim:

1. A microelectronic position sensor for determining changes in an adjustable parameter of an apparatus, said position sensor comprising:

a stationary base portion including magnetic field sensitive elements and an adjustment means rotatably mounted within said adjustment means and including a permanent magnet;

said adjustment means being electrically coupled to the apparatus by means of a plurality of electrically conductive terminals embedded in said adjustment means;

said adjustment means comprising an integrated circuit on which said magnetic field sensitive elements are mounted for providing an electrical signal depending on the position of the permanent magnet and the rotor;

said adjustment means and said stationary base portion comprise housing parts having interengaging flanges and forming together a self-contained unit encompassing the electric and and magnetic components of the position sensor and in which the adjustment means is rotatably mounted on the stationary base member;

a soft-iron member is mounted in the stationary base member to form an iron return path the magnetic system comprising the permanent magnet and the magnetic field sensitive elements; and the electrically conductive contact between the terminals and the integrated circuit is effected by bonding to the integrated circuit, each terminal being separately secured to the integrated circuit.

2. A microelectronic position sensor as claimed in claim 1, wherein said permanent magnet is shaped to obtain an optimum field variation.

3. A microelectronic position sensor as claimed in claim 1, wherein the said stationary base portion includes a mechanical stop for the rotation of said adjustment means.

4. A microelectronic position sensor as claimed in claim 11 wherein said integrated circuit includes a plurality of circularly positioned magnetic field sensitive elements.

* * * * *

UNITED STATES PATENT AND TRADEMARK OFFICE
CERTIFICATE OF CORRECTION

PATENT NO. : 5,592,079
DATED      : January 7, 1997
INVENTOR(S) : Peter U. Scheel It is certified that error appears in the above-identified patent and that said Letters Patent is hereby corrected as shown below:

On the title page, item:
[73] Assignee: Microtronic A/S, Roskilde, Denmark

Signed and Sealed this

Third Day of June, 1997

Attest:

BRUCE LEHMAN

Attesting Officer      Commissioner of Patents and Trademarks